US010394969B2

(12) United States Patent
Sasaki

(10) Patent No.: US 10,394,969 B2
(45) Date of Patent: Aug. 27, 2019

(54) DYNAMICS CALCULATION METHOD, PROGRAM AND RECORDING MEDIUM

(71) Applicant: CANON KABUSHIKI KAISHA, Tokyo (JP)

(72) Inventor: Hironobu Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 14/611,413

(22) Filed: Feb. 2, 2015

(65) Prior Publication Data

US 2015/0227653 A1 Aug. 13, 2015

(30) Foreign Application Priority Data

Feb. 7, 2014 (JP) ................................ 2014-022359

(51) Int. Cl.
*G06G 7/48* (2006.01)
*G06F 17/50* (2006.01)

(52) U.S. Cl.
CPC ...... *G06F 17/5009* (2013.01); *G06F 2217/16* (2013.01)

(58) Field of Classification Search
None
See application file for complete search history.

(56) References Cited

U.S. PATENT DOCUMENTS 4,925,312 A * 5/1990 Onaga .................... B25J 9/1633 318/568.22
5,767,648 A * 6/1998 Morel .................... B25J 9/1628 318/568.1

(Continued)

FOREIGN PATENT DOCUMENTS

JP 3361007 B2 1/2003
JP 2006-285922 A 10/2006
JP 2012-226603 A 11/2012

OTHER PUBLICATIONS

Barreto, João Pedro, et al. "FED-the free body diagram method. Kinematic and dynamic modeling of a six leg robot." Advanced Motion Control, 1998. AMC'98—Coimbra., 1998 5th International Workshop on. IEEE, 1998.*

(Continued)

*Primary Examiner* — Aniss Chad
*Assistant Examiner* — Nithya J. Moll
(74) *Attorney, Agent, or Firm* — Venable LLP

(57) ABSTRACT

When performing dynamics calculation based on a dynamics model formulated by combining many components, it is an object of the present invention to perform accurate dynamics calculation without increasing a processing load. Regarding components connected through a movable axis, components connected through one or more fixed axes moving dependently on a movement of the components are combined to generate one component body connected to the respective components through the movable axis. A model for dynamics calculation is formulated using a component body combining the component and the component and a component body combining the component and the component, and dynamics calculation is performed based on the model for dynamics calculation. It is thereby possible to perform dynamics calculation with high accuracy without increasing a processing load even when using a dynamics model formulated by combining many components.

11 Claims, 8 Drawing Sheets

(56) References Cited

U.S. PATENT DOCUMENTS

| | | | | |
|---|---|---|---|---|
| 5,831,875 | A | 11/1998 | Hirata et al. | |
| 6,330,494 | B1 * | 12/2001 | Yamamoto | B25J 9/1674 700/261 |
| 7,457,698 | B2 * | 11/2008 | Danko | B25J 9/1607 414/1 |
| 8,065,060 | B2 * | 11/2011 | Danko | B25J 9/1628 700/11 |
| 8,099,184 | B2 * | 1/2012 | Schoening | B23K 20/023 700/114 |
| 8,504,337 | B2 * | 8/2013 | Foster | G06T 19/00 345/419 |
| 9,183,674 | B2 * | 11/2015 | Diguet | G06F 17/50 |
| 9,503,704 | B2 * | 11/2016 | Ando | B25J 9/1612 |

OTHER PUBLICATIONS

McMillan, Scott, David E. Orin, and Robert B. McGhee. "Efficient dynamic simulation of an underwater vehicle with a robotic manipulator." IEEE Transactions on Systems, Man, and Cybernetics 25.8 (1995): 1194-1206.*

Nobuhiro Sugimura, et al., "A Study on Product Model for Design and Analysis of Mechanical Assemblies Based on STEP," vol. 8, No. 9, Institute of Systems, Control and Information, 1995, pp. 466-473.

Office Action, dated Jan. 30, 2018, in corresponding Japanese Application No. 2014-022359.

Office Action, dated Nov. 14, 2017, in corresponding Japanese Application No. 2014-022359.

* cited by examiner

DYNAMICS CALCULATION METHOD, PROGRAM AND RECORDING MEDIUM

BACKGROUND OF THE INVENTION

Field of the Invention

The present invention relates to a dynamics calculation method, a program and a recording medium used for a mechanism analysis simulation or the like. The present invention relates, more particularly, to a dynamics calculation method and a non-transitory recording medium that records a program suitable for use in dynamics calculation of a body made up of components connected through a movable axis and components connected through a fixed axis.

Description of the Related Art

Conventionally, when designing a machine product provided with an operation mechanism, mechanism analysis simulations are performed using a calculating machine such as a computer for confirming operation of the product in advance. In a mechanism analysis simulation, a movement of a whole product is simulated by performing dynamics calculation according to forward dynamics based on a dynamics model (also referred to as "simulation model"). A designer of the product (hereinafter referred to as "user") can analyze not only operation of the product but also interference between components included in the product and a force applied to each component by performing a mechanism analysis simulation.

In the case of a multi-axis robot constructed by connecting many components through a movable axis or fixed axis, displacement/speed/acceleration of each component varies depending on, for example, torque input to each axis, and attitude in a time sequence is determined. However, since an actual movement of the multi-axis robot is affected by gravity/inertia or the like, it is difficult for a user to design a product by predicting such an affected movement. Thus, a link mechanism analysis apparatus and a link mechanism indirect data calculation apparatus are being proposed which perform simulations to confirm operation of a multi-axis robot having a link mechanism and confirm interference with a peripheral environment (Japanese Patent Publication No. 3361007). This apparatus simulates an overall movement by performing dynamics calculation using an amount of drive or drive force as an input parameter regarding a link mechanism.

When performing a simulation using a computer, a user needs to construct a simulation model in advance by connecting many components through a movable axis or a fixed axis on a computer. A simulation model having a high degree of reusability is used when performing a simulation of a product such as a multi-axis robot system in particular in which replacement of components, change of component positions, change of a combination of components or the like frequently takes place. This model is convenient because components making up the multi-axis robot system are subdivided in advance and the user can thereby easily construct a simulation model in many patterns by only changing a combination of components as required.

However, conventionally, the more the components are subdivided to increase the degree of reusability, the more noticeably the convenience as a simulation deteriorates. That is, when the components are subdivided, the number of components combined to construct a simulation model increases. Dynamics calculation has a feature that the amount of calculation increases according to the number of components. For this reason, when a simulation model formulated by combining many components is used, the processing load placed on dynamics calculation increases, consequently increasing a time required from the start of a simulation to the result output, resulting in poor usability.

The present invention has been implemented in view of the above-described problems and it is an object of the present invention to provide a dynamics calculation method, a program and a recording medium capable of performing high accuracy dynamics calculation without increasing a processing load when performing dynamics calculation based on a dynamics model formulated by combining many components.

SUMMARY OF THE INVENTION

According to an aspect of the present invention, provided is a dynamics calculation method for calculating a movement of a body comprising a plurality of components connected through a movable axis connecting between the components movable relatively to each other and through a fixed axis connecting fixedly between the components, wherein the method comprising: formulating component body, by a control unit, such that, (1) when there are one or more components connected through fixed axes and moving dependently on a moving of a component connected through a movable axis, the control unit combines the component connected through the movable axis with the one or more components connected through fixed axes into a single component body connected through a movable axis, and, (2) when there is no component connected through a fixed axis and moving dependently on the moving of the component connected through the movable axis, the control unit sets the component connected through the movable axis as the single component body connected through the movable axis; formulating a model for dynamics calculation, by the control unit, such that, based on the component body connected through the movable axis, the control unit formulates the model for dynamics calculation; and performing, by the control unit, the dynamics calculation based on the formulated model for dynamics calculation.

According to the present invention, regarding components connected through a movable axis, a component body is formulated by combining components connected through one or more fixed axes moving dependently on a movement of the components and dynamics calculation is performed based on a model for dynamics calculation formulated using this component body. Thus, even when a dynamics model formulated by combining many components is used, it is thereby possible to perform dynamics calculation with high accuracy without increasing a processing load.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, embodiments of the present invention will be described with reference to the accompanying drawings. First, an apparatus that executes simulation processing using a dynamics calculation method according to the present invention will be described using FIG. 1.

<Simulation Apparatus>

Figure 1:
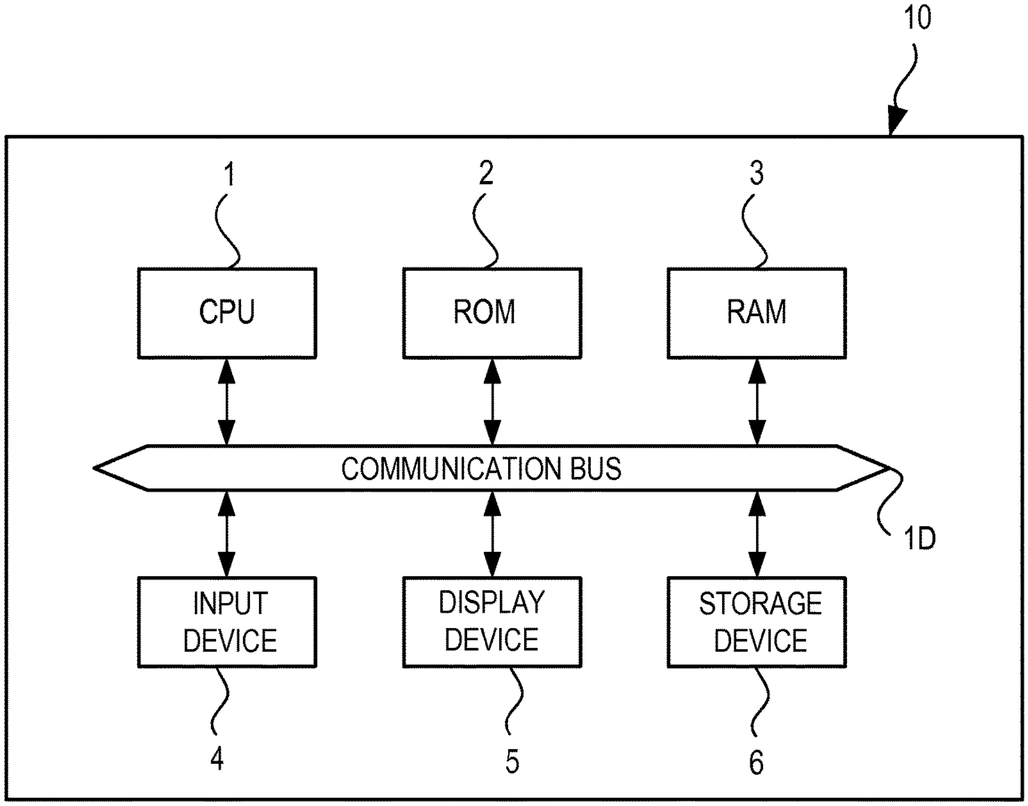
FIG. 1 is a hardware configuration block diagram illustrating an apparatus that executes simulation processing using a dynamics calculation method according to the present invention.
Figure 4:
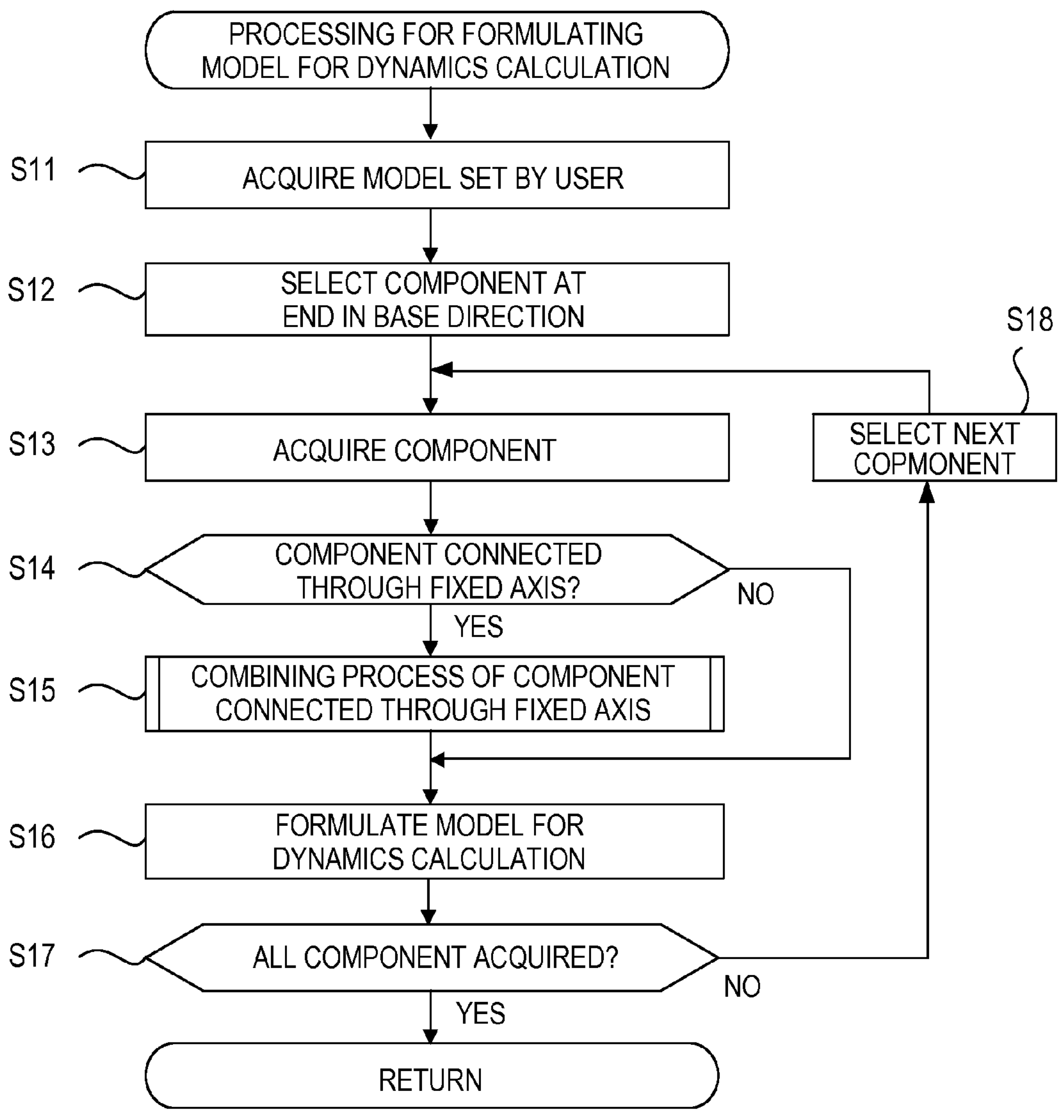
FIG. 4 is a flowchart illustrating processing for formulating a model for dynamics calculation.
Figure 5:
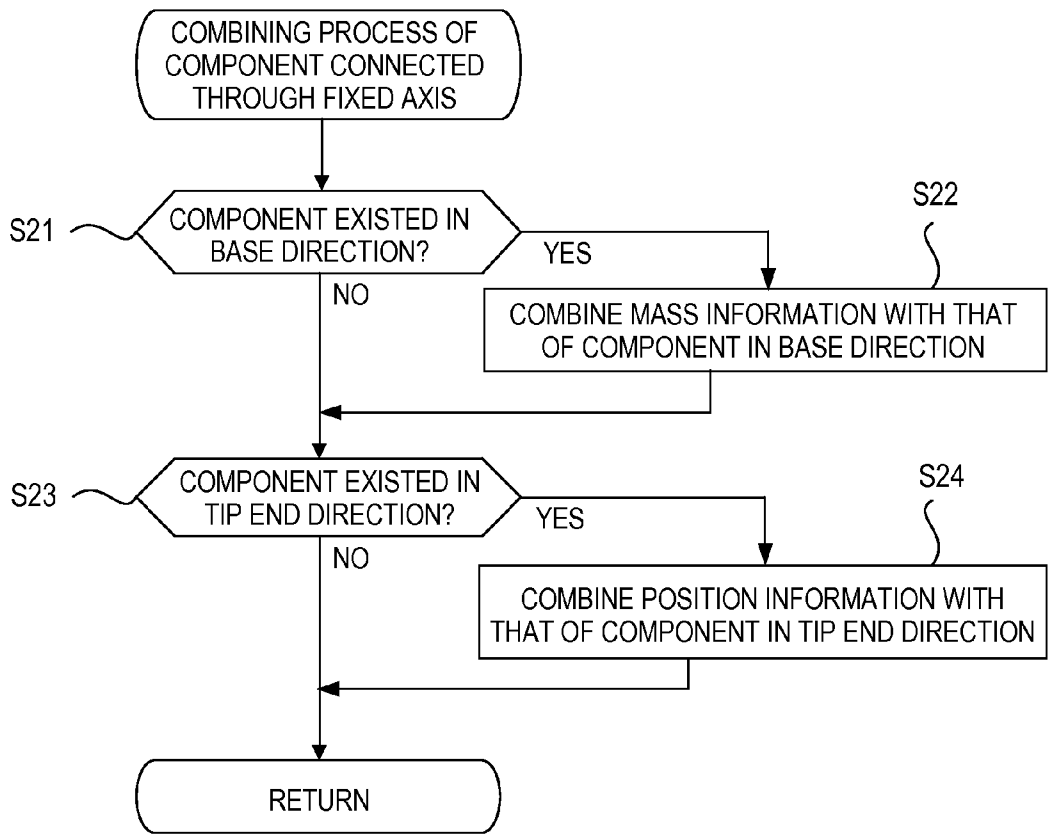
FIG. 5 is a flowchart illustrating a combining process of components connected through a fixed axis.

A simulation apparatus 10 shown in FIG. 1 is constructed using, for example, a personal computer and a mechanism analysis simulation is performed by a computer executing a predetermined control program (see FIG. 3 to FIG. 5 which will be described later). It goes without saying, however, that the simulation processing is not limited to the form of a computer software program, but can also be executed in the form of a micro program processed by, for example, a DSP (digital signal processor).

As shown in FIG. 1, the simulation apparatus 10 is controlled by a computer including a CPU 1, a read-only memory (ROM) 2 and a random access memory (RAM) 3. The CPU 1 functions as a control section that controls operation of the whole apparatus. The ROM 2, the RAM 3, an input device 4, a display device 5 and a storage device 6 are respectively connected to the CPU 1 via a communication bus 1D (e.g., data bus and address bus).

The ROM 2 stores a control program and various types of data to be executed or referenced by the CPU 1. The RAM 3 is used as a working memory that temporarily stores various types of data generated when the CPU 1 executes a predetermined program or as a memory that temporarily stores a program currently being executed or data associated therewith. The input device 4 is a mouse or keyboard connected to the apparatus body and functions as an operator for inputting component data or indicating various control instructions on the CPU 1. The display device 5 is a display made up of a liquid crystal display panel (LCD) or CRT, and displays various screens such as "component data input screen" (see FIG. 2 which will be described later) or a control status of the CPU 1.

Figure 3:
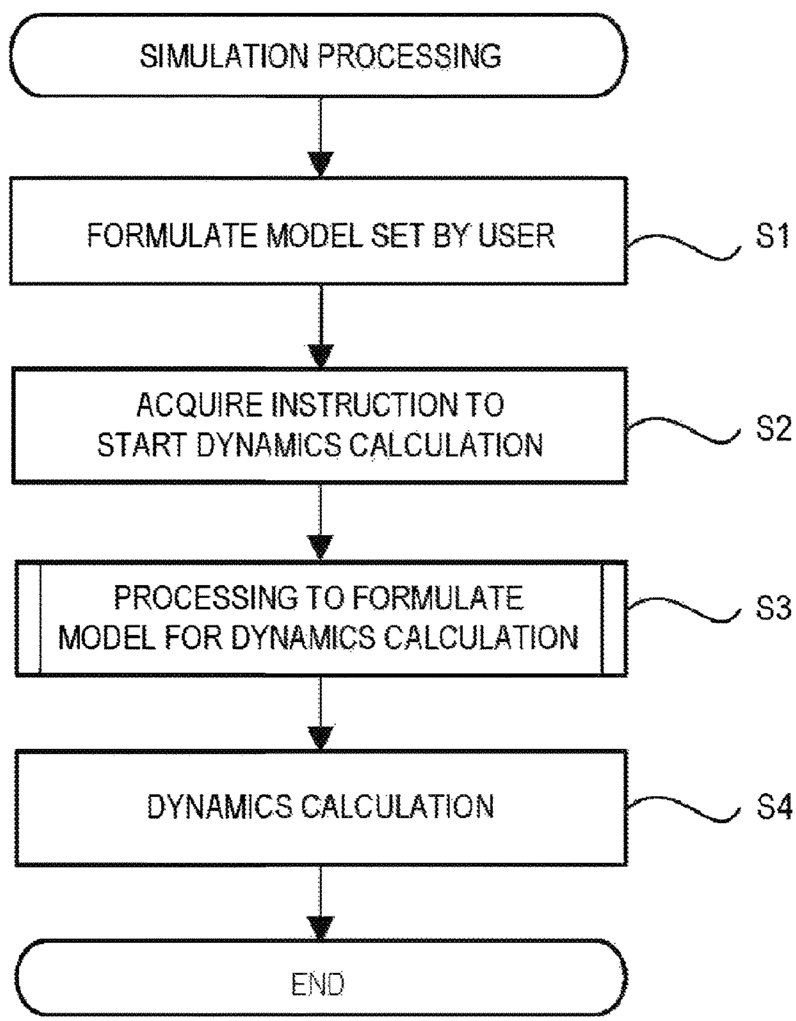
FIG. 3 is a flowchart illustrating simulation processing using the dynamics calculation method according to the present invention.

The storage device 6 stores various types of data such as component data, component body data, model set by a user, model for dynamics calculation in addition to various control programs such as simulation processing executed by the CPU 1 (see FIG. 3). When no control program is stored in the ROM 2, it may be possible to store a control program in the storage device 6, read the control program into the RAM 3 and cause the CPU 1 to execute operation similar to that in the case where the control program is stored in the ROM 2. The storage device 6 is not limited to a hard disk apparatus, but may also be an apparatus using various types of detachable computer-readable storage media.

<Component Data Input Screen>

Figure 2:
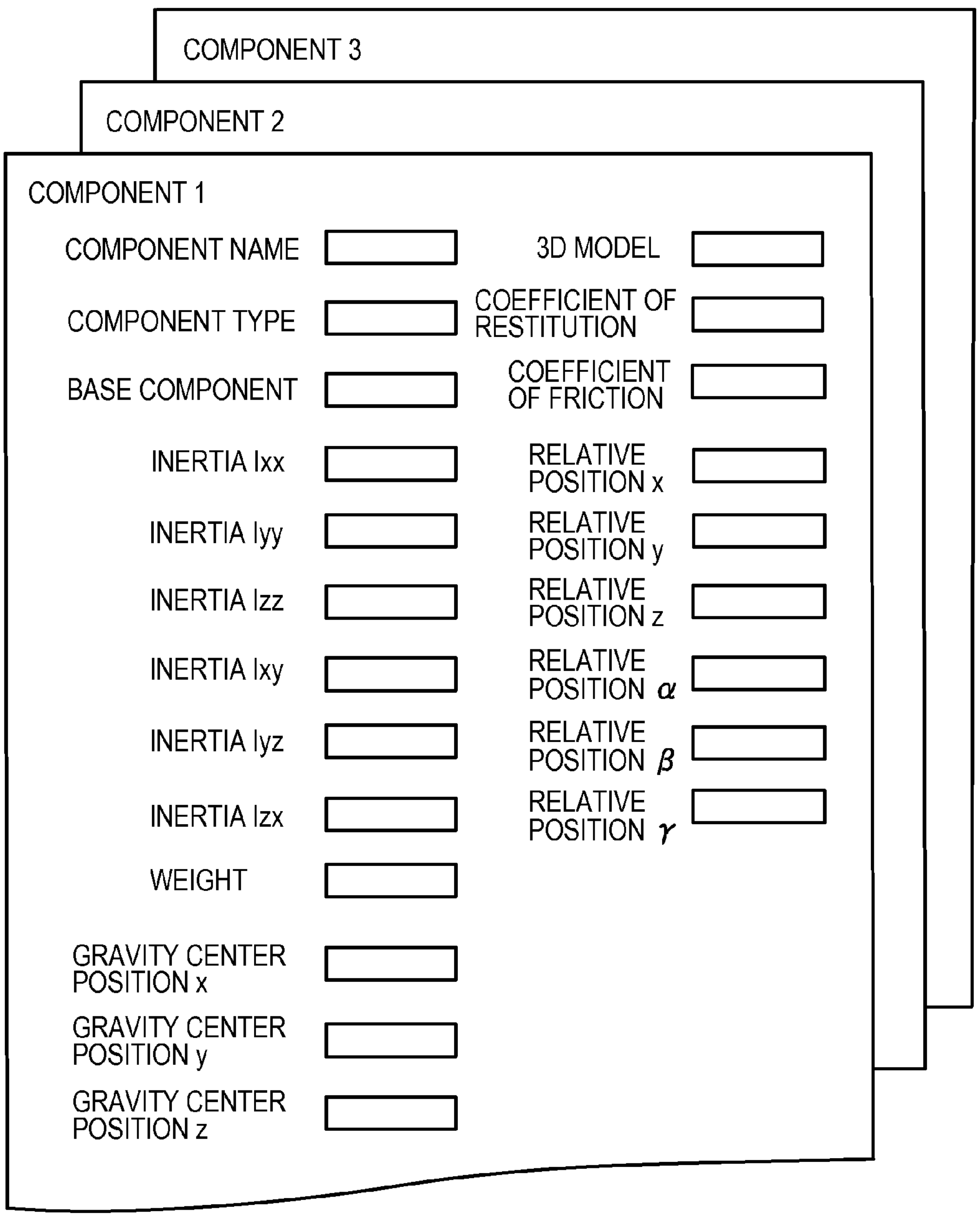
FIG. 2 is a schematic diagram illustrating a component data input screen.

The user can perform a mechanism analysis simulation by executing simulation processing (see FIG. 3) using the apparatus shown in FIG. 1. In order to perform dynamics calculation based on a simulation model in simulation processing, the user needs to formulate a simulation model in advance (hereinafter referred to as "model set by a user"). In the model set by a user, every time a different model is formulated according to a combination of components registered by the user. To formulate a model set by a user, a "component data input screen" which allows the user to register components to be simulated will be described using FIG. 2. The component data input screen shown in FIG. 2 is a screen for the user to input a component name, component type, base component, inertial mass information of the component and position information of the component for each component to be registered. The component data input screen is also a screen for the user to input a coefficient of restitution, coefficient of friction or the like of each component.

The "component name" is a region to input a component to be newly registered as a simulation target (hereinafter referred to as "newly registered component"). The user can assign an optional name to each newly registered component. A base component, slider component, finger component or the like can be input as examples of the component name. The "component type (type information)" is a region to input as to whether the axis for connecting the newly registered component is a movable axis or fixed axis. The user inputs "movable axis" when the newly registered component is a component connected through a movable axis and "fixed axis" when the newly registered component is a component connected through a fixed axis. The "base component" is a region to input a base component to which the newly registered component is connected. Here, a component immediately preceding the newly registered component in a base end direction (conveniently called "base component" for distinction) is input. Examples of the movable axis include axis of rotation, axis of translation, spherical axis and free axis.

The "inertia, weight, position of center of gravity (inertial mass information of a component)" is a region to input a moment of inertia, weight and position of center of gravity of a newly registered component. The "relative position (position information of a component)" is a region to input relative positions of the newly registered component and the base component. A coordinate position of a component coordinate system to which the newly registered component belongs (e.g., world coordinate system, base component coordinate system, slider component coordinate system, finger component coordinate system) and a coordinate position of a component coordinate system to which the base component belongs are input as relative positions. The "inertia, weight, position of center of gravity (inertial mass information of a component)" and "relative position (position information of a component)" are used as input parameters during dynamics calculation. The "coefficient of restitution" and "coefficient of friction" are regions to input a coefficient of restitution and a coefficient of friction of the newly registered component respectively. As will be described later (see FIG. 8), the coefficient of restitution and coefficient of friction can be used as input parameters when performing dynamics calculation taking into account the repulsion or friction of components.

The various types of information on the newly registered component input from the above "component data input screen" are stored in the storage device 6 as component data for each input component. That is, the component data may include a component name, component type (type information), base component, inertial mass information of the component (inertia, weight, position of center of gravity), position information (relative position) of the component and further include the coefficient of restitution and coefficient of friction.

Note that in the present specification, the "movable axis" is an axis that connects between components in a manner relatively movable to each other such as rotation, translation, spherical movement or free movement and the "fixed axis" is an axis that fixedly connects between components so as not to relatively move to each other. Examples of the movable axis include hinge joint, slider joint and universal joint. Components connected through a fixed axis move dependently on a movement of a component connected through a movable axis in the base end direction. The component side on which a reference coordinate system (world coordinate system) is set when calculating position coordinates of each component is called "base end direction (base side)" and the direction opposite to the base end direction is called "tip end direction (distal end side)". The model structure in the tip end direction may be a closed link. In this case, when the closed link is cut, the base end direction and the tip end direction are determined.

<Simulation Processing>

Next, processing of simulating a movement of a whole body by performing dynamics calculation based on a simulation model will be described. FIG. 3 is a flowchart illustrating simulation processing using the dynamics calculation method according to the present invention. The CPU 1 (control section) reads a corresponding control program stored in the ROM 2 or storage device 6 and executes the following processing.

First, in step S1, a model set by a user is formulated according to component registration by the user (model formulation procedure). That is, a "component data input screen" (see FIG. 2) is displayed on the display device 5 to urge the user to register a component to be simulated. With the "component data input screen" being displayed on the display device 5, the user can register components subdivided in advance while changing the combination as required from the "component data input screen." The model set by the user is formulated using a well-known method according to the components registered by the user (more specifically, component data). That is, the registered components are individual elements making up the model set by the user and are connected in order from the base end direction to the tip end direction through the movable axis or fixed axis with reference to the world coordinate system. The formulated model set by the user is stored (saved) in the storage device 6 in association with component data. When reading an already formulated model set by the user (and the corresponding component data) from the storage device 6 and using the model, the process in step S1 needs not be executed.

<Model Set by User>

Figure 6:
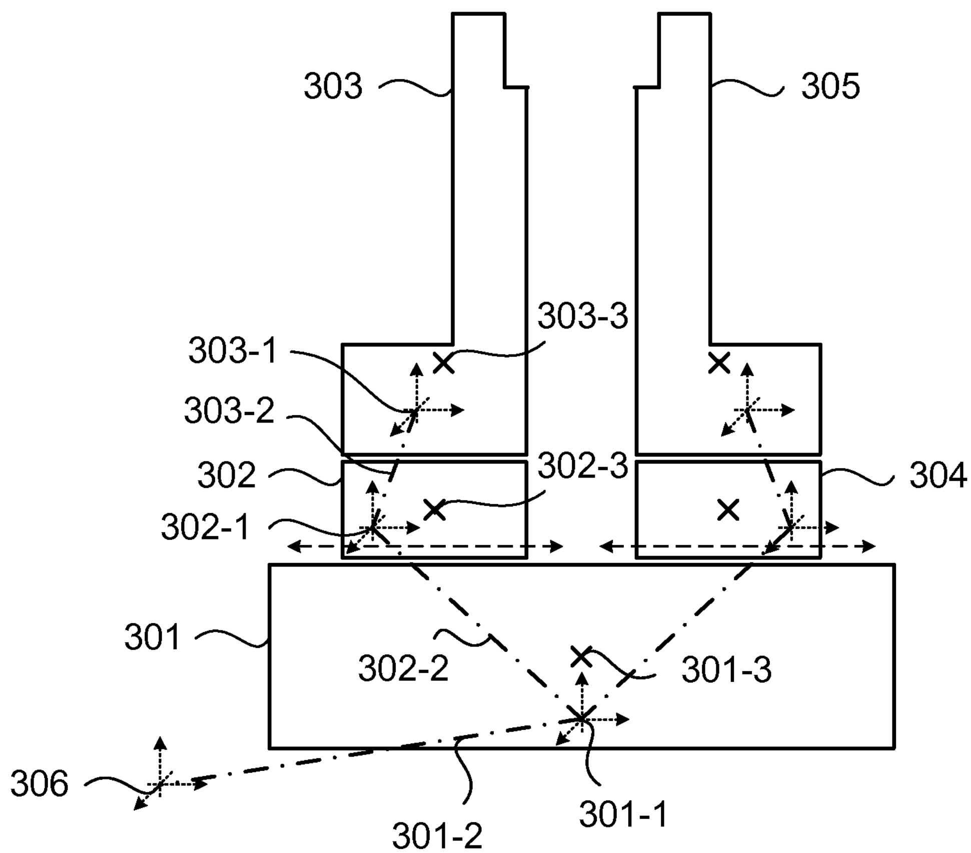
FIG. 6 is a schematic diagram illustrating an example of a model set by a user.

Here, FIG. 6 shows an example of a model set by a user regarding a multi-axis robot constructed by movably connecting components through a movable axis. To make the description easy to understand, FIG. 6 shows an example of a hand (electrically-driven gripper) attached at a distal end of an arm of a multi-axis robot constructed of five components of components 301 to 305. The components 301 to 305 are components registered by the user from the component data input screen and an origin of each coordinate system is input as a relative position from each base component. A simulation model is expressed using the component coordinate system to which each component connected through an axis belongs.

In the model set by the user shown in FIG. 6, component 301 is a base component of the electrically-driven gripper placed in a world coordinate system 306 and connected to the world coordinate system 306 (more specifically a stand (not shown) or the like) through a fixed axis. The component 301 is placed with a relative position 301-2 from the origin of the world coordinate system 306 to the origin of a base component coordinate system 301-1. The relative position 301-2 is determined by a coordinate position of the component coordinate system to which the component 301 belongs (base component coordinate system) and the coordinate position of the component coordinate system to which a component immediately preceding the component 301 in the base end direction (base component) belongs. However, no base component exists with respect to the component 301. In that case, the world coordinate system 306 is used instead of the component coordinate system of the base component. The center of gravity of the component 301 is a center of gravity 301-3.

The component 302 is a slider component of the electrically-driven gripper placed in the base component coordinate system 301-1 and is connected to the base component coordinate system 301-1 through a movable axis of translation. That is, the component 302 is freely movable with respect to the component 301 in a horizontal direction in FIG. 6. The component 302 is placed with a relative position 302-2 from the origin of the base component coordinate system 301-1 to the origin of a slider component coordinate system 302-1. That is, the relative position 302-2 is determined by a coordinate position of the slider component coordinate system to which the component 302 belongs and the coordinate position of the base component coordinate system to which the component 301 immediately preceding the component 302 in the base end direction belongs. The center of gravity of the component 302 is a center of gravity 302-3.

The component 303 is a finger component of the electrically-driven gripper placed in the slider component coordinate system 302-1 and connected to the slider component coordinate system 302-1 through a fixed axis. The component 303 is placed with a relative position 303-2 from the origin of the slider component coordinate system 302-1 to the origin of a finger component coordinate system 303-1. That is, the relative position 303-2 is determined by a coordinate position of the finger component coordinate system to which the component 303 belongs and a coordinate position of the slider component coordinate system to which the component 302 immediately preceding the component 303 in the base end direction belongs. The center of gravity of the component 303 is a center of gravity 303-3.

The component 304 is a slider component of the electrically-driven gripper placed in the base component coordinate system 301-1 as in the case of the component 302 and connected to the base component coordinate system 301-1 through a movable axis of translation. Furthermore, the component 305 is a finger component of the electrically-driven gripper placed in the slider component coordinate system 302-1 as in the case of the component 303 and connected to the slider component coordinate system 302-1 through a fixed axis.

As described above, the component 302 and the component 304 are slider components connected to the component 301 through a movable axis of translation, and the component 303 and the component 305 are finger components connected to the component 302 and the component 304, respectively, through a fixed axis. Therefore, when some input (torque input or the like) is given to each movable axis of the component 302 and the component 304, the component 303 operates dependently on a movement of the component 302 and the component 305 operates dependently on a movement of the component 304 as operation of the model set by the user.

Returning to the description of the processing shown in FIG. 3, an instruction to start dynamics calculation is acquired in step S2. The instruction to start dynamics calculation is indicated by the user through the input device 4. Once the instruction to start dynamics calculation is acquired, "processing to formulate a model for dynamics calculation" is executed (step S3) before executing dynamics calculation (step S4). Although details will be described later (see FIG. 4), in the processing to formulate a model for dynamics calculation, a model for dynamics calculation with fewer components than components making up the model set by the user is newly formulated based on the model set by the user and stored in the storage device 6.

When the processing to formulate a model for dynamics calculation ends, in step S4, the model for dynamics calculation is acquired from the storage device 6 and dynamics calculation is executed based on the model for dynamics calculation (calculation procedure). In this dynamics calculation, calculation according to forward dynamics is performed. A simulation is performed along with the execution of dynamics calculation and the simulation result is displayed on the display device 5. The user can analyze operation of the product (electrically-driven gripper), interference between the components included in the product and forces applied to each component while looking the simulation result displayed on the display device 5. The user can examine or confirm operation of the designed product at the desk without the need for actually making the product experimentally.

<Processing to Formulate Model for Dynamics Calculation>

The processing to formulate a model for dynamics calculation (step S3 in FIG. 3) will be described using FIG. 4. As shown in FIG. 4, the model set by the user is acquired from the storage device 6 first (step S11). Once the model set by the user is acquired, a component located closest to the base among the components making up the model set by the user is selected (step S12). The component located closest to the base is a component for which a reference coordinate system (world coordinate system) is set when calculating position coordinates of each component and the component 301 corresponds to this in the example in FIG. 6. The component selected in step S13 (more specifically, component data) is acquired from the storage device 6 (acquisition procedure).

Next, it is determined whether the acquired component is connected through a fixed axis or not (step S14). Whether the acquired component is connected through a fixed axis or not depends on whether the component is connected through a fixed axis to a component in the base end direction or the world coordinate system 306 or not. When the acquired component is not connected through a fixed axis to a component in the base end direction or the world coordinate system 306 (NO in step S14), the flow jumps to a process in step S16. On the other hand, when the acquired component is connected through a fixed axis to a component in the base end direction or the world coordinate system 306 (YES in step S14), the component is determined to be a component connected through the fixed axis and a "combining process of components connected through a fixed axis" (component body generating procedure) is executed (step S15). In the case of the model set by the user shown in FIG. 6, the component 301 is connected to the world coordinate system 306 through the fixed axis. Moreover, the component 303 and the component 305 are respectively connected to the component 302 and the component 304 in the base end direction through the fixed axis. Therefore, when the acquired component is the component 301, component 303 or component 305, the combining process of the components connected through a fixed axis is executed. On the other hand, the component 302 and the component 304 are connected to the component 301 through a movable axis of translation. That is, the component 302 and the component 304 are not connected to the component in the base end direction or the world coordinate system 306 through the fixed axis. Therefore, when the acquired component is the component 302 or the component 304, the combining process of components connected through a fixed axis is not executed.

In step S16, with the acquired component added, a model for dynamics calculation is formulated (formulation procedure). The formulated model for dynamics calculation is stored in the storage device 6. This model for dynamics calculation is formulated using the acquired components. However, when the component is a component for which inertial mass information and position information are combined along with the execution of the "combining process of components connected through a fixed axis" (see FIG. 5) which will be described later, a model for dynamics calculation is formulated using the component body (more specifically, component body data) having the combined inertial mass information and position information. After the formulation of the model for dynamics calculation, it is determined whether or not all the components included in the model set by the user are acquired (step S17). When all the components are not acquired (NO in step S17), the next component in the tip end direction is selected (step S18) and the processes in above steps S13 to S16 are repeated. On the other hand, when all the components are acquired (YES in step S17), this processing to formulate a model for dynamics calculation is finished.

<Combining Process of Component Connected Through Fixed Axis>

The combining process of components connected through a fixed axis (step S15 in FIG. 4) will be described using FIG. 5. As shown in FIG. 5, it is first determined whether or not a base component exists for the acquired component (step S21). When the base component exists (YES in step S21), the inertial mass information of the acquired component is combined with the inertial mass information of the base component (step S22). That is, the inertial mass information of the component connected through the fixed axis is combined with the inertial mass information of the component immediately preceding the component in the base end direction with respect to the component. Next, it is determined whether or not the component exists in the tip end direction with respect to the acquired component (step S23). When the component exists in the tip end direction (YES in step S23), the position information of the acquired component is combined with the position information of the component in the tip end direction with respect to the component (step S24).

When the combining process of components connected through a fixed axis is repeated for each component connected from the base end direction to the tip end direction, the inertial mass information of the component connected through the fixed axis is combined with the inertial mass information of the component connected through the movable axis in the base end direction. On the other hand, the position information of the component connected through the fixed axis is combined with the position information of the component located in the tip end direction.

Here, the combination of the inertial mass information of the component and the position information of the component will be described. The inertial mass information of the component refers to information on three elements: weight, center of gravity and moment of inertia. A case will be described below where inertial mass information of component "A" and inertial mass information of component "B" are combined into component body "C" having new inertial mass information.

<Combination of Inertial Mass Information>

A combination of weights between the components is calculated according to expression 1 shown below.

$$M_C = M_A + M_B \quad \text{[Expression 1]}$$

where, M denotes a weight of the component.

A combination of centers of gravity between the components is calculated using expression 2 shown below.

$$COG_C = \frac{(COG_A M_A + COG_B M_B)}{M_A + M_B} \quad \text{[Expression 2]}$$

where, COG denotes a center of gravity of the component.

A combination of moments of inertia between the components is calculated using a parallel axis theorem. First, when a moment of inertia with respect to the axis that passes through the center of gravity with respect to the respective components is Ig, a moment of inertia I at a position at a three-dimensional distance S=(x, y, z) parallel to this axis can be calculated according to expression 3 shown below. "E" in expression 3 is a unit matrix. "T" is a symbol representing a transpose matrix.

$$I = Ig + M(S^T SE - SS^T) \quad \text{[Expression 3]}$$

To combine moments of inertia between the components, central axes of moments of inertia are aligned using a parallel axis theorem and summed up. The moment of inertia of component body "C" combined from the moment of inertia of component "A" and the moment of inertia of component "B" is calculated according to expression 4 shown below.

$$\begin{aligned} I_{g_C} &= I_A + I_B \quad \text{[Expression 4]} \\ &= I_{g_A} + M_A(S_{AC}^T S_{AC} E - S_{AC} S_{AC}^T) + I_{g_B} + M_B \\ &\quad (S_{BC}^T S_{BC} E - S_{BC} S_{BC}^T) \end{aligned}$$

However, $S_{AC}$ in expression 4 is a three-dimensional distance from the center of gravity of component "A" to the center of gravity of component body "C" and $S_{BC}$ is a three-dimensional distance from the center of gravity of component "B" to the center of gravity of component body "C." "E" in expression 4 is a unit matrix. "T" is a symbol representing a transposed matrix.

As described above, by combining the respective pieces of inertial mass information of component "A" and component "B," component body "C" having new inertial mass information is generated.

<Combination of Position Information>

On the other hand, the position information of a component refers to a translation parameter and a rotational transfer parameter. For example, when position information in a three-dimensional space is expressed by a 4×4 homogeneous transformation matrix which means rotational translation, an expression for combining position information of component "A" with position information of component "B" to calculate new position information of component "B" is shown in following expression 5.

$$R_B^{new} = R_A R_B^{old} \quad \text{[Expression 5]}$$

In above expression 5, a homogeneous transformation matrix expressing a relative position from a component coordinate system in the base end direction of each component is represented by "R." New position information of component "B" calculated by combining position information using this corresponds to the position information of component body "C."

<Model for Dynamics Calculation>

Figure 7:
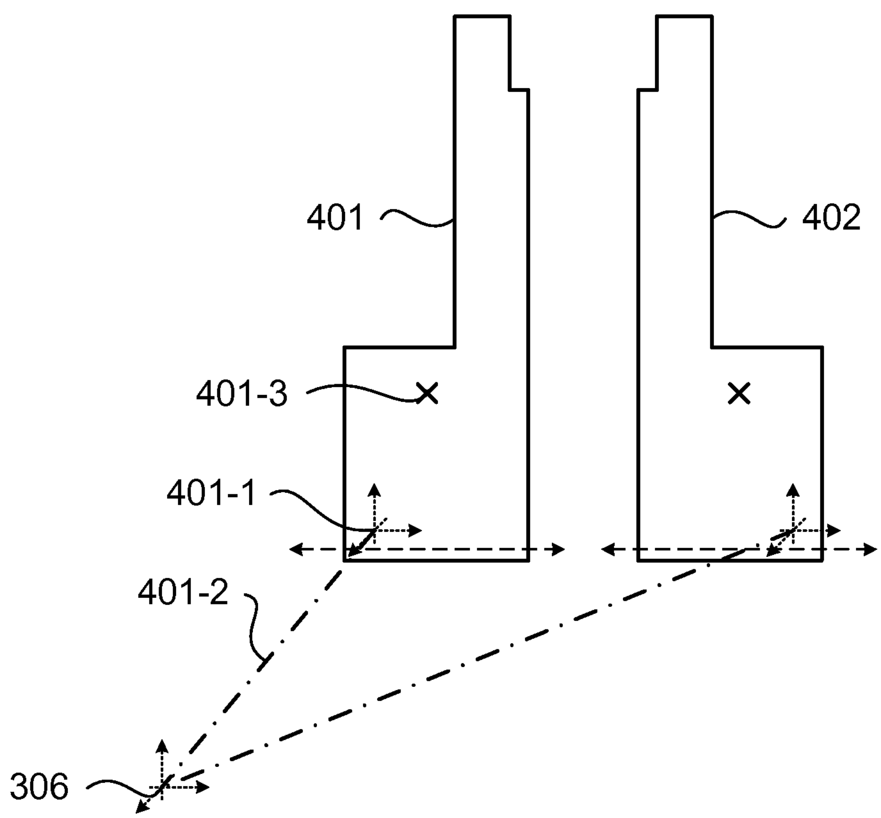
FIG. 7 is a schematic diagram illustrating an example of a model for dynamics calculation.

When the aforementioned combining process of components connected through a fixed axis is repeatedly executed (steps S14 to S18), components connected through one or more fixed axes moving dependently on a movement of components connected through a movable axis are combined and one component body connected through the movable axis is generated for each component connected through the movable axis. A model for dynamics calculation is formulated by these component bodies. Thus, FIG. 7 shows an example of the model for dynamics calculation formulated by the aforementioned processing to formulate a model for dynamics calculation. The model for dynamics calculation shown in FIG. 7 is formulated based on the model set by the user shown in FIG. 6. This will be described below step by step. However, since the component 304 and the component 305 will be subjected to processing similar to that on the component 302 and the component 303, description thereof will be omitted.

In the model set by the user shown in FIG. 6, component data of components 301 to 303 connected from the base end direction toward the tip end direction is acquired in order. Since the component 301 is connected to the world coordinate system 306 through the fixed axis, the component 301 is subjected to the combining process of components connected through a fixed axis. Since the component 301 has no base component, the inertial mass information is not combined. On the other hand, since the component 301 has the component 302 in the tip end direction, the position information (301-2) of the component 301 is combined with the position information (302-2) of the component 302. At this time, first component body data is generated for which position information is rewritten by the combined position information (401-1) based on the component data of the component 302. Although the position information of the component is registered as a relative position from the base component, when the position information is combined, the position information after the combination has a relative position from the base component of the component connected through the fixed axis (world coordinate system when no base component exists). Next, a model for dynamics calculation is formulated, and since the component 301 connected to the world coordinate system 306 through the fixed axis is not to be calculated at the time of dynamics calculation, the component 301 is not included in the model for dynamics calculation.

Since the component 302 is a component connected through the movable axis, the combining process of components connected through a fixed axis is not performed. Therefore, neither combination of inertial mass information nor combination of position information is performed. When formulating a model for dynamics calculation, first component body data having position information (401-2) combined with the position information (301-2) of the component 301 is used instead of the component data.

Since the component 303 is a component connected through the fixed axis, the component 303 is subjected to a combining process of components connected through a fixed axis. Since the base component of the component 303 is the component 302, the inertial mass information (center of gravity 303-3) of the component 303 is combined with the inertial mass information (center of gravity 302-3) of the component 302. At this time, inertial mass information of the already generated first component body data is rewritten by the inertial mass information (center of gravity 401-3) after the combination and the first component body data is updated. Note that since the component 303 has no component in the tip end direction, the position information is not combined. When formulating a model for dynamics calculation, first component body data is used which has position information (401-2) combined with the position information of the component 301 and inertial mass information (center of gravity 401-3) combined with the inertial mass information of the component 303. Thus, a first component body 401 having the new position information (401-2) and new inertial mass information (center of gravity 401-3) is generated in the model for dynamics calculation. Using second component body data, a second component body 402 having new position information (402-2) and new inertial mass information (new center of gravity 402-3) is generated in the model for dynamics calculation.

In the processing to formulate a model for dynamics calculation, for example, when no component is combined along with the execution of the combining process of components connected through a fixed axis, the model set by the user is stored in the storage device 6 as a model for dynamics calculation as is.

When dynamics calculation is performed based on a simulation model, an external force or acceleration needs to be calculated for each component making up the model. If so, dynamics calculation needs to be performed for each of the five components 301 to 305 in the model set by the user shown in FIG. 6. In contrast, with the model for dynamics calculation shown in FIG. 7, dynamics calculation may be performed on two component bodies respectively: the first component body 401 into which the component 302 and the component 303 are combined and the second component body 402 into which the component 304 and the component 305 are combined. That is, the number of components to be simulated is reduced from 5 to 2. Since the amount of calculation of dynamics calculation increases as the number of components increases, the smaller the number of components to be calculated, the better. Therefore, combining the component connected through the fixed axis whose relative position does not change with respect to the component in the base end direction with the component connected in advance through the movable axis as described above, contributes to a reduction of the amount of calculation of dynamics calculation and thus leads to a reduction of processing load. More specifically, compared to the case where dynamics calculation is performed based on the model set by the user shown in FIG. 6, performing dynamics calculation based on the model for dynamics calculation shown in FIG. 7 can reduce the amount of calculation by 60% and can reduce the time required for a simulation compared to the prior art.

As described above, even when the user formulates a model set by the user made up of many components connected through the movable axis or fixed axis, in dynamics calculation, a model for dynamics calculation is used for which components connected through the fixed axis are combined with components connected through the movable axis and the number of components is reduced. Since dynamics calculation is performed based on the model for dynamics calculation with the reduced number of components, it is possible to reduce the time required for a simulation compared to the prior art. The user can use a simulation model having a high degree of reusability and making it easier to replace components or change positions or change a combination of components without constraints even when many components are combined. That is, the user needs not formulate a model while comparing the number of components to be combined to increase accuracy with the time required for a simulation involved in an increase in the number of components, which increases convenience in simulation through dynamics calculation.

<Second Embodiment>

Figure 8:
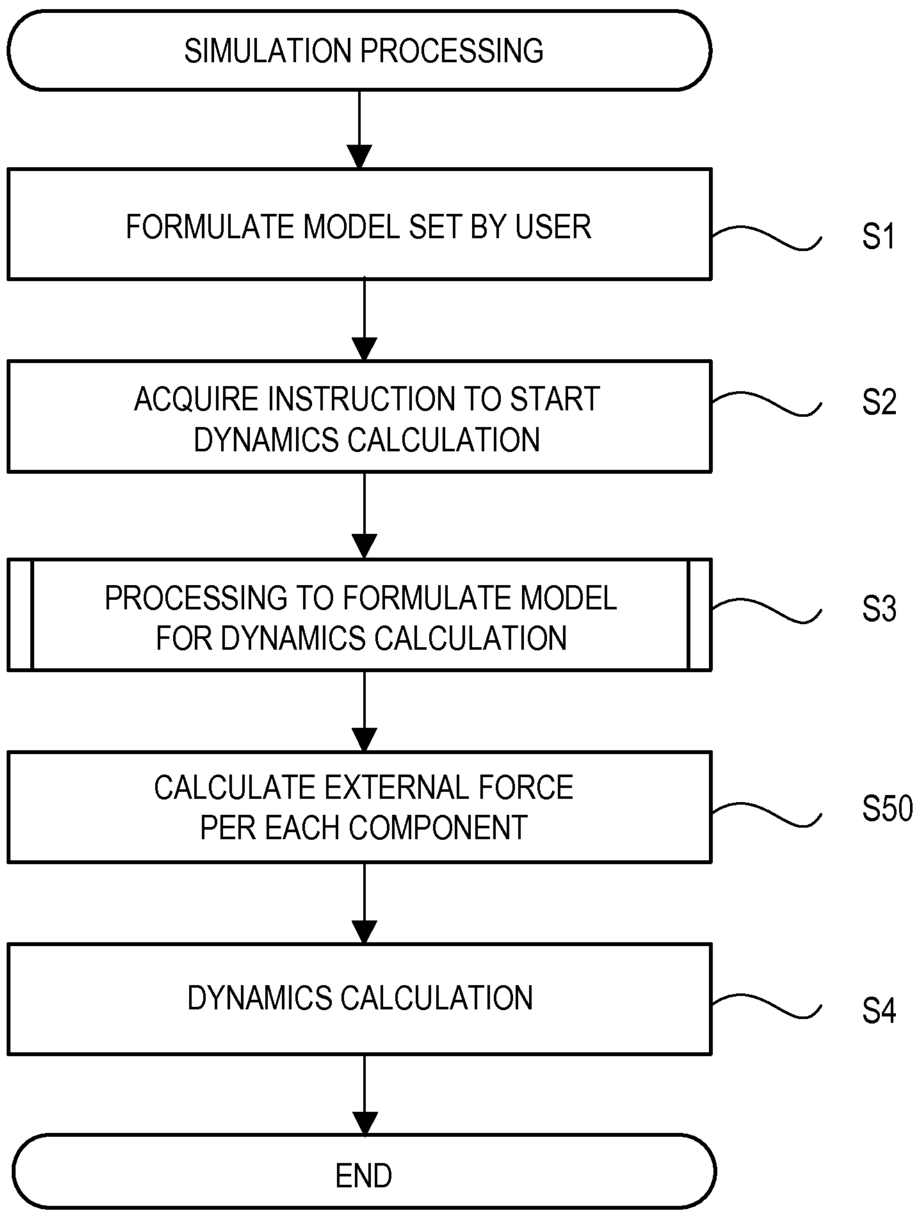
FIG. 8 is a flowchart illustrating simulation processing using another embodiment of a dynamics calculation method.

When performing a simulation with repulsion or friction of components taken into consideration, a coefficient of restitution or coefficient of friction is preferably allowed to be set for each component. For example, in the case of the model set by the user shown in FIG. 6, different coefficients of restitution or coefficients of friction may be set for the component 302, component 303, component 304 and component 305. However, in the model for dynamics calculation shown in FIG. 7, a coefficient of restitution or coefficient of friction can be set for only the first component body 401 and the second component body 402. Thus, in the case where it is preferred to take repulsion or friction of each component before a combination into consideration, calculation may be performed by taking repulsion or friction of each component into consideration using a model set by the user and then dynamics calculation may be performed using a model for dynamics calculation. FIG. 8 shows an example of such simulation processing. Here, parts of overlapping description with the simulation processing shown in aforementioned FIG. 3 will be assigned the same reference numerals and description thereof will be omitted.

The simulation processing shown in FIG. 8 is different from the simulation processing shown in FIG. 1 in that an external force is calculated for each component (step S50) after performing processing to formulate a model for dynamics calculation (step S3 in FIG. 3), and then dynamics calculation is performed (step S4). That is, in external force calculation for each component in step S50 (external force calculation procedure), a model set by the user is acquired from the storage device 6 and a repulsive force or frictional force is calculated based on the acquired model set by the user for each component. In dynamics calculation (step S4), dynamics calculation is performed using external forces such as the calculated repulsive force or frictional force as input parameters of dynamics calculation. At this time, since the repulsive force or frictional force acting on each component of the model set by the user has a position and a direction in the coordinate system of each component, when a repulsive force or a frictional force is generated in components connected through the fixed axis, the force is processed as a force acting on the component body in which inertial mass information of the components connected through the fixed axis is combined. By this means, when performing a simulation with the contact force taken into consideration, the contact force is calculated using the coefficient of restitution or coefficient of friction set for each component of the model set by the user corresponding to the contact point and this contact force is reflected on dynamics calculation based on the model for dynamics calculation.

As described above, a model set by the user having many components is used as is to calculate a repulsive force or a frictional force for each component and a model for dynamics calculation with a reduced number of components is used for dynamics calculation. In dynamics calculation, a repulsive force or frictional force or the like determined using the model set by the user can be used as input parameters. This allows the user to perform a simulation with higher accuracy by taking into account repulsion or friction of components or the like without taking much time from the start of a simulation to the result output, which is advantageous.

Other Embodiments

Embodiment(s) of the present invention can also be realized by a computer of a system or apparatus that reads out and executes computer executable instructions (e.g., one or more programs) recorded on a recording medium (which may also be referred to more fully as a 'non-transitory computer-readable recording medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the recording medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the recording medium. The recording medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022359, filed Feb. 7, 2014, which is hereby incorporated by reference herein in its entirety.

What is claimed is:

1. A method of performing a simulation of movement of a robot having (i) a movable component and (ii) a plurality of fixed components, the method comprising:

acquiring, by a CPU, component data of each of the movable component and the plurality of fixed components, the component data containing (i) inertial mass information of each of the movable component and the plurality of fixed components, and (ii) position information of each of the movable component and the plurality of fixed components, wherein a first fixed component of the plurality of components is connected to the movable component in a tip end direction of the movable component and a second fixed component of the plurality of components is connected to the movable component in a base end direction of the movable component, and wherein the first fixed component is movable dependently on a movement of the movable component and the movable component is movable relative to the second fixed component;

formulating, by the CPU, a model for simulating the movement of the robot by:

a step of combining the inertial mass information of only the first fixed component among the first and second fixed components with the inertial mass information of the movable component; and a step of combining the position information of only the second fixed component among the first and second fixed components with the position information of the movable component; and simulating the movement of the robot based on the model.

2. The method according to claim 1, wherein, in a case of performing the simulation of movement of the robot by the CPU, an external force exerted on each of the plurality of components, and an acceleration of each of the plurality of components are calculated.

3. The method according to claim 1, wherein the robot is a multi-axis robot assembled by connecting the plurality of fixed components movably through the movable component.

4. The method according to claim 1, wherein the inertial mass information contains information as to a position of center of gravity.

5. The method according to claim 1, wherein the position information is at least one of a translation parameter and a rotational transfer parameter.

6. A non-transitory computer-readable recording medium storing a program for operating a computer to execute a method of performing a simulation of movement of a robot having (i) a movable component and (ii) a plurality of fixed components the method comprising:

acquiring, component data of each of the movable component and the plurality of fixed components, the component data containing (i) inertial mass information of each of the movable component and the plurality of fixed components, and (ii) position information of each of the movable component and the plurality of fixed components, wherein a first fixed component of the plurality of components is connected to the movable component in a tip end direction of the movable component and a second fixed component of the plurality of components is connected to the movable component in a base end direction of the movable component, and wherein the first fixed component is movable dependently on a movement of the movable component and the movable component is movable relative to the second fixed component;

formulating a model for simulating the movement of the robot by:

a step of combining the inertial mass information of only the first fixed component among the first and second fixed components with the inertial mass information of the movable component; and a step of combining the position information of only the second fixed component among the first and second fixed components with the position information of the movable component; and simulating the movement of the robot based on the model.

7. A simulation apparatus for simulating movement of a robot having (i) a movable component and (ii) a plurality of fixed components, the simulation apparatus comprising:

a display device; and a CPU that operates to:

acquire component data of each of the movable component and the plurality of fixed components, the component data containing (i) inertial mass information of each of the movable component and the plurality of fixed components, and (ii) position information of each of the movable component and the plurality of fixed components, wherein a first fixed component of the plurality of components is connected to the movable component in a tip end direction of the movable component and a second fixed component of the plurality of components is connected to the movable component in a base end direction of the movable component, and wherein the first fixed component is movable dependently on a movement of the movable component and the movable component is movable relative to the second fixed component;

formulate a model for simulating the movement of the robot by:

a step of combining the inertial mass information of only the first fixed component among the first and second fixed components with the inertial mass information of the movable component; and a step of combining the position information of the second fixed component with the position information of the movable component;

simulate the movement of the robot based on the model; and display the simulated movement of the robot on the display device.

8. The simulation apparatus according to claim 7, wherein, when the movement of the robot is simulated by the CPU, an external force exerted on the model and an acceleration of the model are calculated for each of the components.

9. The simulation apparatus according to claim 7, wherein the robot is a multi-axis robot assembled by connecting the plurality of fixed components movably through the movable component.

10. The method according to claim 7, wherein the inertial mass information contains information as to a position of center of gravity.

11. The method according to claim 7, wherein the position information is at least one of a translation parameter and a rotational transfer parameter.

* * * * *